(12) United States Patent
Harmer et al.

(10) Patent No.: US 10,921,428 B1
(45) Date of Patent: Feb. 16, 2021

(54) METHOD AND SYSTEM FOR DETERMINING DIELECTRIC PROPERTIES OF AN OBJECT

(71) Applicant: Plymouth Rock Technologies Inc., Plymouth, MA (US)

(72) Inventors: Stuart William Harmer, West Sussex (GB); Dana E. Wheeler, Plymouth, MA (US)

(73) Assignee: Plymouth Rock Technologies Inc., Plymouth, MA (US)

( * ) Notice: Subject to any disclaimer, the term of this patent is extended or adjusted under 35 U.S.C. 154(b) by 0 days.

(21) Appl. No.: 16/560,480

(22) Filed: Sep. 4, 2019

(51) Int. Cl.
*G01S 7/41* (2006.01)
*G01S 13/88* (2006.01)

(52) U.S. Cl.
CPC ............. *G01S 7/411* (2013.01); *G01S 13/887* (2013.01)

(58) Field of Classification Search
None
See application file for complete search history.

(56) References Cited

U.S. PATENT DOCUMENTS

| | | | |
|---|---|---|---|
| 2008/0116374 A1 | 5/2008 | Ouchi et al. | |
| 2012/0049863 A1 | 3/2012 | Ostwald et al. | |
| 2012/0146832 A1 | 6/2012 | Jeck et al. | |
| 2012/0307967 A1 | 12/2012 | Smith | |
| 2015/0369756 A1 | 12/2015 | Rezgui et al. | |
| 2018/0321372 A1* | 11/2018 | Manneschi | G01N 22/00 |

FOREIGN PATENT DOCUMENTS

GB 2516410 A 1/2015

* cited by examiner

*Primary Examiner* — Whitney Moore
(74) *Attorney, Agent, or Firm* — Nelson Mullins Riley & Scarborough LLP; Thomas J. Engellenner; Reza Mollaaghababa

(57) ABSTRACT

In one aspect, a system for obtaining dielectric properties of an object is disclosed, which comprises a plurality of transceivers for generating radiation in the microwave or millimeter-wave region of the electromagnetic spectrum. The transceivers are positioned in spatially fixed relationships relative to one another. The system further includes a controller for selectively activating the transceivers for irradiating at least a portion of the object and detecting at least a portion of the radiation reflected from said portion of the object in response to the irradiation, where each of the activated transceivers generates a signal in response to detection of the reflected radiation. The reflected signals are analyzed to determine a plurality of reflectivity coefficients corresponding to different discrete locations of the object, and the reflectivity coefficients are used to determine the complex permittivity of the discrete locations.

30 Claims, 12 Drawing Sheets

METHOD AND SYSTEM FOR DETERMINING DIELECTRIC PROPERTIES OF AN OBJECT

BACKGROUND

The present teachings are generally directed to methods and systems for determining complex permittivity of an object of interest, e.g., the sole of a shoe.

Conventional systems that employ microwave or millimeter-wave radiation to scan an object of interest are known. By way of example, conventional systems that mechanically scan radiation from a single microwave/millimeter-wave transceiver to image the sole of a shoe are known. Such systems, however, provide a limited ability for identifying materials concealed within the shoe. Such methods typically form a three-dimensional image of a shoe, where mechanical movement generates lateral image dimensions and the axial image dimension is obtained by using radar techniques. A partially reflected electromagnetic radiation from the shoe and structures/objects within the shoe provides the image features in the axial dimension, for example, at a discontinuity where the dielectric properties change. In a system in which such illumination and reception take place monostatically, the reflection of radiation from isotropic materials is independent of radiation polarization. At normal incidence, the electric and magnetic field vectors are, by definition, perpendicular to the surface normal and therefore, for the case of an isotropic medium, there is no polarization dependence. This limitation prevents the extraction of material properties unambiguously from the axial features in the image. For example, one may obtain the product of the depth and refractive index of a layer within the illuminated structure, but one cannot separate these two quantities without additional information.

Accordingly, there is a need for enhanced systems and methods for determining dielectric properties of objects.

SUMMARY

In one aspect, a system for obtaining dielectric properties of an object is disclosed, which comprises a plurality of transceivers for generating radiation in the microwave or millimeter-wave region of the electromagnetic spectrum. The transceivers are positioned in spatially fixed relationships relative to one another. The system further includes a controller for selectively activating the transceivers for irradiating at least a portion of the object and detecting at least a portion of the radiation reflected from said portion of the object in response to the irradiation, where each transceiver receiving reflected radiation from the object generates a signal in response to detection of the reflected radiation. The system also includes an analyzer for computing, for each of a plurality of pixels in the irradiated portion of the object, one or more reflectivity coefficients (reflectivity parameters), where each reflectivity coefficient is associated with a pair of transceivers positioned to irradiate the pixel and each reflectivity coefficient is proportional to a ratio of a signal detected by one of the pairs of transceivers in a frequency band relative to a signal transmitted by the other transceiver of the pair in that frequency band.

The analyzer can further compute, for each of the plurality of pixels and for each pair of transceivers positioned to irradiate that pixel, an angle subtended between that pixel and the pair of transceivers.

Each of the reflectivity coefficients can be represented as a complex number having a magnitude that is indicative of a fraction of radiation reflected from a pixel in response to radiation incident thereon via a transceiver in a pair of transceivers associated with the reflectivity coefficient, and a component indicative of a phase shift associated with the reflected radiation.

The analyzer can be configured to compute a complex permittivity associated with a pixel based on the reflectivity coefficient and the angle corresponding to that pixel.

In some embodiments, the analyzer can employ an electromagnetic model of the object and non-linear regression to fit the reflectivity coefficients and the angles to one or more parameters of the model so as to extract the complex permittivity.

Each of the reflectivity coefficients in frequency domain representation can be given by the following relation:

$$B_{ik} = A_{jk} F_{ijk} \Gamma_{ijk},$$

where, $B_{ik}$ represents a signal in $k^{th}$ frequency band received by the $i^{th}$ transceiver, $A_{jk}$ represents a signal transmitted in $k^{th}$ frequency band by the $j^{th}$ transceiver, $\Gamma_{ijk}$ represents a reflectivity coefficient that relates $B_{ik}$ and $A_{jk}$, and $F_{ijk}$ represents propagation effects between the $i^{th}$ and the $j^{th}$ transceivers.

The analyzer can be configured to compute each of the $F_{ijk}$ coefficients via calibration.

In some embodiments, an object under study comprises a plurality of stratified dielectric layers. The analyzer can employ an electromagnetic model of the object and non-linear regression to derive complex permittivities and thicknesses of the stratified dielectric layers.

In some embodiments, the controller is configured to activate the transceivers sequentially to transmit radiation to the object. In another embodiment, the controller is configured to activate at least a portion of the transceivers concurrently. In some embodiments, the concurrently-activated transceivers emit radiation in different frequency bands. By way of example, in some embodiments, the different frequency bands can be separated from one another by implementing frequency division multiplexing, such that multiple pairs of pixels may transmit and receive simultaneously to reduce the time required to achieve a complete scanning of an object of interest. As an example, for a system with N transceivers, there exists $$\frac{1}{2} N(N+1)$$

non-degenerate pairs of transceivers over which a signal may be transmitted and received. If the number of non-degenerate pairs of transceivers is equal to or less than the number of frequency steps, M, required for constructing a complete frequency sweep, then in some embodiments, all transceiver pairs can be operated simultaneously to provide a frequency sweep with frequencies that are sufficiently separated to enable unambiguous reception. For example, in some embodiments, the frequencies can be separated from one another by a value $\Delta f$, in a range of about $$\Delta f \sim \frac{1}{\tau},$$

where $\tau$ is the sampling time of the radar system.

In some embodiments, the object can be the sole of shoe. In such embodiments, the shoe can be positioned on a platform that is substantially transparent to radiation emitted by the transceivers, such that the sole of the shoe can be irradiated with the radiation. In some such embodiments, the electromagnetic model of a shoe is employed that represents the sole of the shoe as a stratified region comprising a finite number of layers disposed between two semi-infinite regions. By way of example, one of the semi-infinite regions can include air and another one of the semi-infinite regions can include the skin. The analyzer can employ the electromagnetic model of the sole of the shoe and non-linear regression to determine complex permittivity and thickness of each of the finite number of layers.

In some embodiments, at least a portion of the transceivers generates polarized electromagnetic radiation. In some embodiments, a portion of the transceivers can generate s-polarized radiation and another portion of the transceivers can generate p-polarized radiation. In some embodiments, an object under test is interrogated with both s- and p-polarized radiation.

In some embodiments, the controller can activate the transceivers so as to irradiate at least a portion of the object under study with p-polarized radiation during one temporal period and with s-polarized radiation during another temporal period. The analyzer can compute the reflectivity coefficients for the s- and p-polarized illuminating radiation and use these coefficients, in a manner discussed herein, to compute values for complex permittivity of the object. In some embodiments, obtaining data for both s and p polarizations can provide additional information that can help determine the dielectric properties of the object of interest. In particular, since the reflectivity coefficients for s- and p-polarized radiation are generally different, with the exception of normal and grazing incidence, the measurements of reflectivity coefficients for both polarization states can provide twice the data compared to the measurement of reflectivity coefficients for one polarization state. The additional data can facilitate the extraction of complex permittivity data associated with the object under investigation.

In a related aspect, a system for scanning a sole of a shoe is disclosed, which comprises a plurality of transceivers for generating radiation in the microwave or millimeter-wave region of the electromagnetic spectrum, where the transceivers are positioned in spatially fixed relationships relative to one another. The system can include a platform on which the shoe can be positioned, where the platform is substantially transparent to radiation emitted by the transceivers and positioned relative to the transceivers to allow illumination of the sole of the shoe by radiation emitted by the transceivers. The system can also include a controller for selectively activating the transceivers for illuminating at least a portion of the sole of the shoe and detecting radiation reflected from said portion of the sole in response to the illumination, where each of the transceivers receiving at least a portion of radiation reflected from the sole of the shoe in response to illumination thereof generates a detection signal. An analyzer is provided for computing, for each of a plurality of pixels (discrete locations) in the illuminated portion of the sole of the shoe, one or more reflectivity coefficients, where each reflectivity coefficient is associated with a pair of transceivers positioned to illuminate that pixel and each reflectivity coefficient is proportional to a ratio of a signal detected by one of said pairs of transceivers in a frequency band relative to a signal transmitted by the other transceiver of the pair in that frequency band. The analyzer can further compute, for each pixel and for each pair of transceivers positioned to illuminate that pixel, an angle subtended between that pixel and the pair of transceivers. The analyzer is configured to compute a complex reflectivity coefficient associated with each of the pixels based on the reflectivity coefficient and the angle corresponding to that pixel.

Each reflectivity coefficient associated with a pixel can be represented as a complex number having a magnitude that is indicative of a fraction of radiation reflected from that pixel in response to radiation incident thereon via a transceiver in a pair of transceivers associated with the reflectivity coefficient, and a component indicative of a phase shift associated with the reflected coefficient.

The analyzer can employ an electromagnetic model of the shoe and non-linear regression to fit the reflectivity coefficients and the angles to one or more parameters of the model in order to extract a complex permittivity for each of a plurality of pixels. The representation of the reflectivity coefficients in the frequency domain is provided above.

In some embodiments, the sole of the shoe can be modeled as a plurality of stratified dielectric layers. For example, the sole of the shoe can be represented as a stratified region comprising a finite number of layers disposed between two semi-infinite regions. By way of example, one of the semi-infinite regions can comprise air and another one of the semi-infinite regions can comprise skin. The analyzer can be configured to employ the stratified model of the sole of the shoe and non-linear regression to determine complex permittivity and thickness of each of the finite number of layers.

In some embodiments, the sole of the shoe can be illuminated with polarized radiation, e.g., s- or p-polarized radiation. In some embodiments, the controller can activate the transceivers so as to irradiate at least a portion of the sole of the shoe with p-polarized radiation during one temporal period and with s-polarized radiation during another temporal period. The analyzer can compute the reflectivity coefficients for s- and p-polarized radiation.

In a related aspect, a method of determining dielectric properties of an object is disclosed, which comprises using a plurality of transceivers positioned in spatially fixed relationships relative to one another to illuminate at least a portion of the object with electromagnetic radiation. For each of a plurality of discrete locations in the irradiated portion of the object, a reflectivity coefficient associated with a pair of transceivers positioned to irradiate that location is computed, where each reflectivity coefficient is proportional to a ratio of a signal detected by one of the pairs of transceivers in a frequency band in response to a signal transmitted by other transceiver of the pair in that frequency band.

In some embodiments, the method further calls for computing, for each of the plurality of discrete locations and for each pair of transmit/receive transceivers, an angle subtended between the discrete locations and the pair of transceivers.

Each of the reflectivity coefficients is represented as a complex number having a magnitude that is indicative of a fraction of radiation reflected from that discrete location in response to radiation incident thereon via a transceiver in a pair of transceivers associated with said reflectivity coefficient, and a component indicative of a phase shift associated with said reflected radiation.

A complex permittivity associated with each discrete location of the object can be computed based on the reflectivity coefficient and the angle corresponding to that discrete location.

In some embodiments, an electromagnetic model of the object and non-linear regression can be employed to fit the reflectivity coefficients and the angles to one or more parameters of the model so as to extract the complex permittivity.

In a related aspect, a system for obtaining dielectric properties of an object is disclosed, which comprises a plurality of radiation sources generating RF radiation in different frequency bands, and a plurality of transceivers in communication with said RF radiation sources for receiving radiation generated thereby. An RF switch array operationally disposed between the plurality of RF radiation sources and the transceivers allows selectively applying radiation generated by each of the RF radiation sources to one, or a subset, of the transceivers.

In some embodiments, the RF switch array is configured such that the transceivers receive concurrently the RF radiation generated by the RF sources at different frequencies (more generally, in different frequency bands). The transceivers can then concurrently irradiate different portions of a sample under test (SUT) with RF radiation at different frequencies. In some embodiments, a plurality of circulators are operably coupled to the transceivers so as to direct at least a portion of the radiation detected by the transceivers (i.e., a portion of the radiation reflected by the SUT) to a phase and amplitude comparison circuitry. The phase and amplitude comparison circuitry is in communication with the RF switch array to receive a portion of the radiation generated by the RF sources and compare the phase and amplitude of the transmitted radiation at each frequency with the phase and amplitude of the detected reflected radiation at that frequency. A control and processing unit can receive the amplitude and phase comparison data and operate on that data in a manner disclosed herein so as to obtain information regarding dielectric properties of the SUT. The control and processing unit can also operate the RF switch array.

Further understanding of various aspects of the invention can be obtained by reference to the following detailed description in conjunction with the associated drawings, which are described briefly below.

DETAILED DESCRIPTION

Figure 1A:
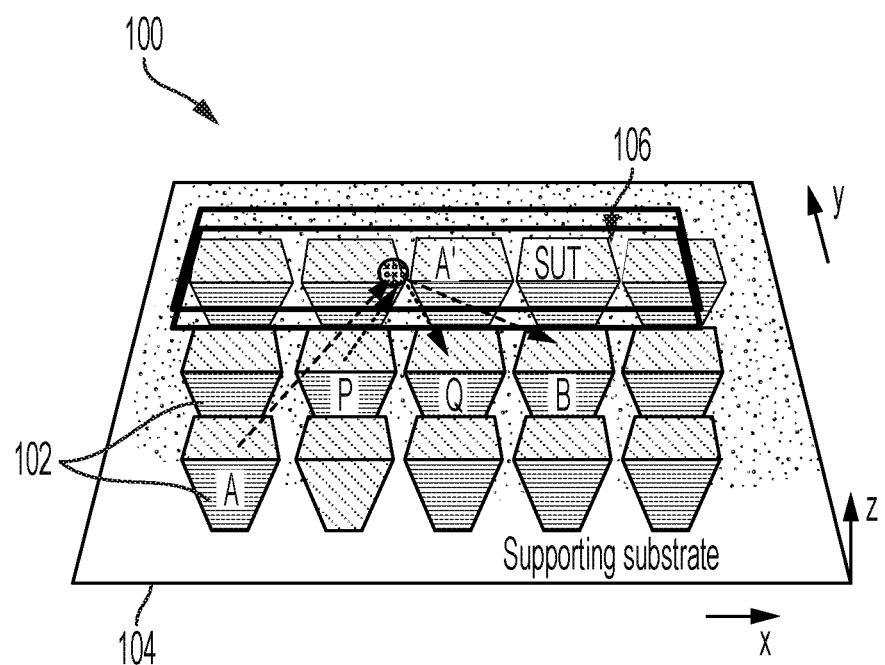
FIG. 1A schematically depicts a system according to an embodiment of the present teachings for detecting dielectric properties of an object.

The present teachings are generally directed to systems and methods for determining dielectric properties of an object, e.g., the sole of a shoe. As discussed in more detail below, in many embodiments, a plurality of transmit/receive transceiver pairs are employed to interrogate the object with microwave and/or millimeter-wave radiation. In many embodiments, each member of the transceiver pair can function both as a transmitter and a receiver. At least a portion of the radiation reflected by a portion of the object in response to irradiation by one transceiver of the pair can be detected by the other transceiver of the pair. The detected reflected radiation can be processed in a manner discussed herein to determine a reflectivity coefficient associated with that irradiated location and the transceiver pair. A plurality of such reflectivity coefficients can be analyzed to derive complex permittivity values associated with a plurality of locations of the object.

By using an array of transceivers in accordance with the present teachings, information regarding dielectric properties of an object (real and imaginary parts of permittivity) and dimensions of various dielectric layers of an object can be obtained. In many embodiments, the electromagnetic radiation reflected from an object at a series of N transceivers is measured. While in some embodiments, a single polarization (preferably p-polarization) is employed, in other embodiments, both s- and p-polarizations can be used. In some embodiments, multiple-input and multiple-output (MIMO) transceivers can be employed using multiplexing techniques. In some such embodiments, the entire electromagnetic operational band can be split into M sub-bands so as to acquire up to MN(N+1) measurements, comprising ½MN(N+1) measurements in the s-polarized state and ½MN(N+1) measurements in the p-polarized state. As discussed in more detail below, non-linear regression can be employed to obtain a best fit of the data to a mathematical model of the object to deduce information about dielectric properties of the object, e.g., complex permittivity associated with different portions (e.g., different layers) of the object. Further, using the known relative positions of the transceivers, spatial locations can be assigned to the reflectivity data and hence form "images" of material properties of the object. Although the present teachings can be applied to a variety of different dielectric objects, in some embodiments, the present teachings are applied to the sole of a shoe in order to obtain complex permittivity of one or more dielectric layers of the sole, as discussed in more detail below.

Various terms are used herein in accordance with their ordinary meanings in the art. The term "substantially" as used herein denotes a variation of at most 10% relative to a complete state and/or value. For example, when used to modify a numerical value, the term "substantially" denotes a variation of less than 5% of that numerical value.

The term "millimeter-wave region of the electromagnetic spectrum," as used herein, refers to radiation wavelengths in a range of about 30 GHz to about 300 GHz (corresponding to vacuum wavelengths in a range of about 0.001 m to about 0.01 m). The term "microwave region of the electromagnetic spectrum," as used herein, refers to radiation wavelengths in a range of about 0.3 GHz to about 30 GHz (corresponding to vacuum wavelengths in a range of about 0.01 m to about 1 m). The term "radiofrequency" and its abbreviation (RF) is intended to encompass the millimeter-wave and the microwave regions of the electromagnetic spectrum.

The term "discrete location" as used herein refers to a three-dimensional volume of the object that is illuminated by a transceiver and reflects at least a portion of the incident light in response to such illumination. In this disclosure, the volume (V) of a discrete location can be given by $$V \approx \frac{z^2 c^3}{2ab f^2 \Delta f},$$

where z denotes the separation of the plane of the transceivers to the object being illuminated; c denotes the speed of light in vacuum; a and b denote the lengths of the sides of a rectangular antenna to a transceiver; f denotes the center frequency of the emitted radiation and $\Delta f$ denotes the bandwidth of the emitted radiation. In this disclosure, the term "pixel" can also be used to refer to such a discrete location of the object. As discussed in more detail below, the present teachings can be employed to determine the complex permittivity at a plurality of discrete locations of the object. In some embodiments, the values of the complex permittivity obtained for a plurality of discrete locations of the object can be employed to provide a dielectric image of the object, i.e., a two-dimensional or three-dimensional representation of values of complex permittivity of the discrete locations as a function of spatial coordinates of those locations.

The term "about" as used herein to modify a numerical value is intended to indicate a deviation of at most 10% relative to that numerical value.

The term "frequency band" as used herein refers to an interval in the frequency domain, delimited by a lower frequency and an upper frequency, e.g., a continuous range of frequencies extending about a central frequency. Some examples of IEEE frequency bands are provided in Table 1 below:

TABLE 1

| Band Designation | Frequency Range (GHz) |
|---|---|
| HF | 0.003-0.03 |
| VHF | 0.03-0.3 |
| UHF | 0.3-1 |
| L | 1-2 |
| S | 2-4 |
| C | 4-8 |
| X | 8-12 |
| $K_u$ | 12-18 |
| K | 18-27 |
| $K_a$ | 27-40 |
| V | 40-75 |
| W | 75-110 |
| G | 110-300 |

FIG. 1A schematically depicts a system 100 according to an embodiment of the present teachings for detecting the dielectric properties of an object, which includes an array of transceivers 102 arranged in accordance with a fixed two-dimensional pattern such that the positions of the transceivers relative to one another are fixed and known. Without any loss of generality, the two-dimensional pattern is assumed to be in the x-y plane with transceivers protruding above the plane along the z-direction. In this embodiment, the transceivers 102 are arranged according to a square x-y pattern. In other embodiments, the transceivers can be distributed according to a rectangular, hexagonal, or other regular x-y pattern.

More generally, in some embodiments, the transceivers can have an irregular positional arrangement so long as the positions of the transceivers are known, e.g., the x- and y-distances of each transceiver relative to a reference location and/or a reference transceiver are known.

In this embodiment, the transceivers are arranged in a regular 3×5 pattern. Other numbers of transceivers can also be employed. In general, any number of transceivers can be employed, e.g., depending on the application for which the system is designed. For example, the number of transceivers can be in a range of 2 to about 200, e.g., in a range of about 10 to about 100, and they can be arranged according to a variety of different arrangements, such as those discussed above.

In some embodiments, the transceivers 102 generate and detect radiation having one or more wavelengths in the microwave and/or millimeter-wave regions of the electromagnetic spectrum. Some examples of transceivers suitable for use in the practice of the invention can be obtained from Anritsu Corporation of Japan, Keysite Technologies of U.S.A., Rohde & Schwarz GmbH & Co. of Germany.

The transceivers can be coupled to a supporting substrate 104, which can maintain the transceivers at the desired fixed locations. The supporting substrate 104 can be formed of any suitable material, such as transparent polymeric materials. For example, in some embodiments, the supporting substrate can be formed of Nylon®, Perspex®, PTFE (poly tetrafluoroethylene), or other radiotransparent and mechanically suitable materials. Further, the transceivers can be coupled to the supporting substrate using any suitable coupling mechanism, such as brackets, and can be formed of PTFE or other similar materials, which can be effective in minimizing, and preferably removing, reflections from the air/substrate interface.

Figure 1B:
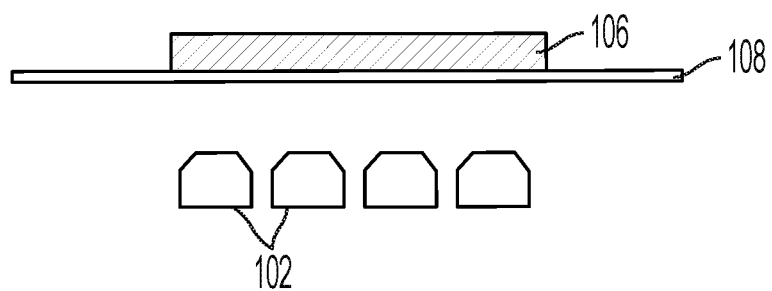
FIG. 1B is a partial schematic depiction of the system shown in FIG. 1A, illustrating a number of transceivers, a sample under test (SUT), and a platform on which the SUT is positioned, FIG. 1C schematically depicts that the reflectivity parameters of a discrete location of the SUT can be calculated by employing a pair of transceivers to irradiate that location with radiation and detect the radiation reflected by that location in response to the irradiation, FIG. 2 provides a schematic, two-dimensional representation of a discrete location of SUT.

A sample under test (SUT) 106 (which is herein also referred to as an object under test) can be positioned above the array of transceivers. By way of example, as shown schematically in FIG. 1B, in some embodiments, the SUT 106 can be placed over a platform 108 (herein also referred to as a supporting substrate) that is substantially transparent to the radiation generated by the transceivers so as to allow the passage of the radiation emitted by the transceivers in a substantially unimpeded manner for illuminating the SUT 106. The platform 108 can be formed of any suitable material that does not exhibit appreciable absorption of the radiation emitted by the transceivers, such as Nylon®, Perspex®, PTFE, or other radiotransparent and mechanically suitable materials.

Referring again to FIG. 1A, at least a portion of the radiation transmitted by each transceiver illuminates a discrete location of the object 106 and at least a portion of the radiation incident on that discrete location of the object is reflected and is received by another of the transceivers 102. By way of example, a portion of the radiation emitted by one of the transceivers (A) is received by a discrete location (A') of the sample under test and is reflected by that discrete location such that the reflected radiation is received by another one of the transceivers (B) in the array. Further, in this example, a portion of the radiation emitted by another transceiver (P) also illuminates the discrete location (A') of the sample and the reflected radiation is received by transceiver (Q) in the array.

As discussed in more detail below, the complex permittivity corresponding to the illuminated discrete location (A') can be reconstructed from the received signal and the mean or characteristic angle between each pair of transmitting and receiving transceivers associated with that discrete location. In this example, the incident/reflected paths corresponding to the transmitting/receiving transceiver pair (A,B) as well as the pair (P,Q) correspond to the same discrete location (i.e., the discrete location designated as A') and therefore provide spatially co-located information about the reflectivity of the discrete location (A') of the SUT 106 at different angles of incidence.

More specifically, the reflected signal in the $k^{th}$ frequency channel associated with a discrete location that is received by a transceiver is proportional to the incident signal in the $k^{th}$ frequency channel transmitted by another transceiver, where the proportionality constant includes contributions from the reflectivity of an illuminated discrete location of the object as well as path-dependent effects of the propagation of radiation between the transceivers. This relation between the received and transmitted radiation between a pair of transceivers can be mathematically presented in frequency domain as follows:

$$B_{ik} = A_{jk} F_{ijk} \Gamma_{ijk} \qquad \text{Eq. (1)}$$

where, $B_{ik}$ refers to the signal in the $k^{th}$ frequency channel received by the $i^{th}$ transceiver, $A_{jk}$ refers to the signal in the $k^{th}$ frequency channel transmitted by the $j^{th}$ transceiver, $\Gamma_{jk}$ refers to the reflectivity of the portion of the object that is incident by radiation transmitted by the $i^{th}$ transceiver and reflects a portion of the radiation onto the $j^{th}$ transceiver to be detected thereby, and $F_{ijk}$ is a parameter that accounts for the effects of propagation of radiation between the $i^{th}$ and the $j^{th}$ transceivers.

The illuminated discrete location can have a variety of shapes, ranging from an irregular shape to a geometrical shape, such as parallelepiped, sphere, etc.

As discussed in more detail below, the contribution of $F_{ijk}$ to the above relation can be determined via calibration of the system. More particularly, a known SUT or calibration sample can be used to calibrate the system by allowing a comparison of the measurement of an unknown SUT with the results of the measurement of the calibration sample. The reflectivity response of the calibration sample, i.e., $\tilde{\Gamma}_{ijk}$, can be determined, e.g., via measurement or theoretically (a-priori), and can be used in the above relations, in the following manner.

More specifically, for the calibration sample, the reflected signal received in the $k^{th}$ frequency channel by the $i^{th}$ transceiver in response to radiation emitted in the $k^{th}$ frequency channel by the $j^{th}$ transceiver can be represented by the following mathematical relation:

$$\tilde{B}_{ik} = A_{jk} F_{ijk} \tilde{\Gamma}_{ijk} \qquad \text{Eq. (2)}$$

The above Equations (1) and (2) can then be used to obtain the following relation for $\Gamma_{ijk}$:

$$\Gamma_{ijk} = \frac{B_{ik}}{\tilde{B}_{ik}} \tilde{\Gamma}_{ijk} \qquad \text{Eq. (3)}$$

A variety of different calibration samples can be employed in the practice of the present teachings. For example, with reference to FIG. 1B, rather than using the SUT 106, a metal sheet disposed on the platform 108 above the transceivers can be such a calibration sample. The reflectivity parameter $\tilde{\Gamma}_{ijk}$ associated with such a metal sheet can be ±1 depending on the polarization state, where the plus sign corresponds to p polarization and the minus sign corresponds to s polarization relative to the imaging plane. Hence, for such a calibration sample, the following relation can be obtained:

$$\Gamma_{ijk} = \pm \frac{B_{ik}}{\tilde{B}_{ik}} \qquad \text{Eq. (4)}$$

In other words, the reflectivity parameters can be obtained via division of the received signals for the SUT relative to the respective signals for the calibration sample.

In other embodiments, other calibration samples, such as a dielectric sample, can be employed.

Figure 1C:
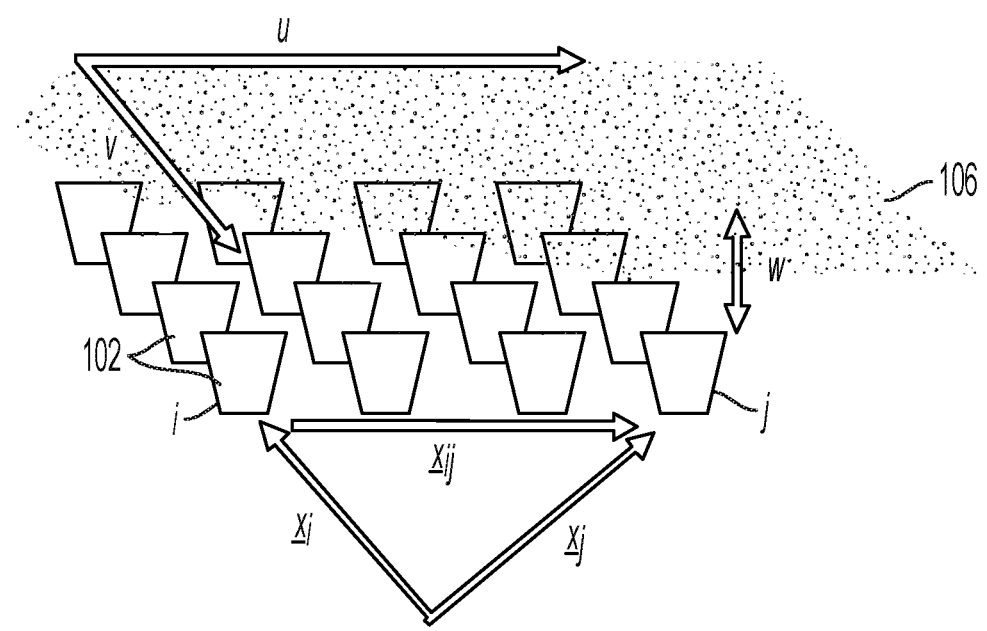
Figure 2:
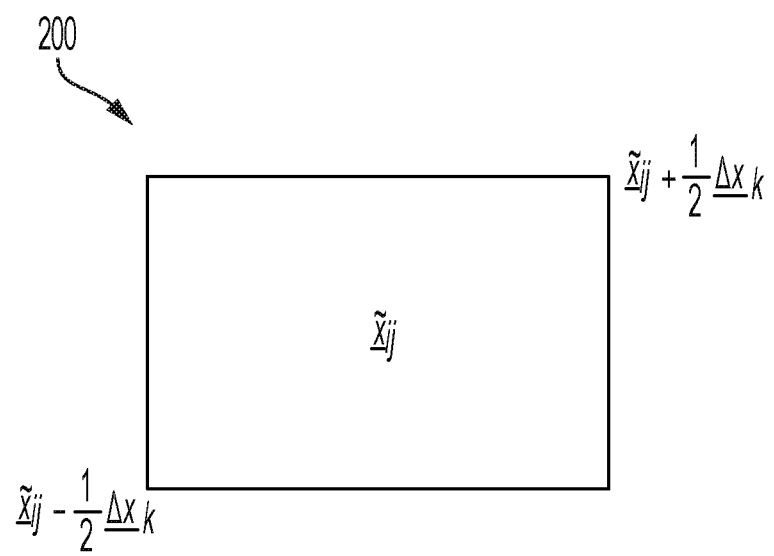

The reflectivity parameter $\Gamma_{ijk}$ is composed of amplitude and phase information, which can be represented mathematically by a complex number. With reference to FIGS. 1C and 2, preferably, by transmitting and receiving p-polarized electromagnetic radiation between the transceivers, one can acquire the reflectivity parameters for a discrete location that is associated with a plurality of pairs of transceivers, e.g., a discrete location receiving radiation from one transceiver and reflecting radiation to another transceiver of a transmit/receive pair. It should be understood that although it is assumed that the illumination is achieved using p-polarized radiation, the teachings described in connection with FIGS. 1C and 2 apply equally to s-polarized radiation.

In the following discussion, $\Gamma_{ijk}[x_{ij}]$, represents the reflectivity parameter associated with a pair of transceivers (i,j), which emit and receive radiation in the $k^{th}$ frequency channel and are separated from one another by a displacement vector $x_{ij}$, which can be defined as follows:

$$x_i + \tilde{x}_{ij} = x_j \qquad \text{Eq. (5)}$$

Further assuming, without any loss of generality, that the array of transceivers is distributed in a plane parallel to the imaging plane so that the transceivers and the imaging plane are separated by a fixed distance w, the point represented by a vector, $\tilde{x}_{ij}$, nominally provides the center of a pixel formed between the $i^{th}$ and $j^{th}$ transceivers, where, $$\tilde{x}_{ij} = \frac{1}{2}(x_i + x_j) \qquad \text{Eq. (6)}$$

The angle, $\theta_{ij}$, subtended between pixel point, $\tilde{x}_{ij}$, and the $i^{th}$ or $j^{th}$ transceivers is then given by the following relation:

$$\theta_{ij} = \tan^{-1}\left(\frac{|x_i - x_j|}{2w}\right) \qquad \text{Eq. (7)}$$

Hence, in the above example, the spatial data that is captured is, $\Gamma_{ijk}[\tilde{x}_{ij}]$, where $$\tilde{x}_{ij} = \frac{1}{2}(x_i + x_j)$$

and the angular value associated with that spatial data is:

$$\theta_{ij} = \tan^{-1}\left(\frac{|x_i - x_j|}{2w}\right).$$

The magnitude of the complex number $\Gamma_{ijk}[\tilde{x}_{ij}]$ represents the fraction of the amplitude of the incoming radiation that is reflected from the SUT and the phase angle of the complex number represents the phase change of the radiation upon reflection. Using the corresponding $\theta_{ij}$ and a suitable electromagnetic model of the SUT, one can estimate the material properties of the SUT at different positions $\tilde{x}_{ij}$.

For example, FIG. 2 schematically depicts a pixel 200 that is centered on $\tilde{x}_{ij}$ and is defined by the diffraction pattern of the radiation emitted by the $i^{th}$ transceiver such that the transmitted radiation beam illuminates the rectangular area defined by the vector $\Delta x_k$. For example, in the far field region, the vector $\Delta x_k$ can be defined as follows:

$$\Delta x_k = \frac{wc}{f_k}\left(\frac{1}{a_u}\hat{u} + \frac{1}{a_v}\hat{v}\right) \quad \text{Eq. (8)}$$

where, $\hat{u}$ and $\hat{v}$ denote the basis unit vectors tangential to the image plane and parallel to the edges of the rectangular receiver antennas that comprise the array, c is the speed of light in vacuum, and $a_u$ and $a_v$ are the aperture dimensions of the transceiver antenna horn in the respective tangential directions of the imaging plane.

For each position, $\tilde{x}_{ij}$, the pairs of all transceivers (p,q) that transmit and receive radiation which partially or completely overlaps with the associated pixel can be obtained by using the following inequality:

$$\tilde{x}_{pq} - \frac{1}{2}\Delta x_k \le \tilde{x}_{ij} \le \tilde{x}_{pq} + \frac{1}{2}\Delta x_k \quad \text{Eq. (9)}$$

More specifically, for each $\tilde{x}_{ij}$, some or all transceivers (i,j) for which $\tilde{x}_{ij}$ satisfy the above inequality will be considered as those that transmit radiation to and receive radiation from the associated pixel (discrete location).

Figure 3:
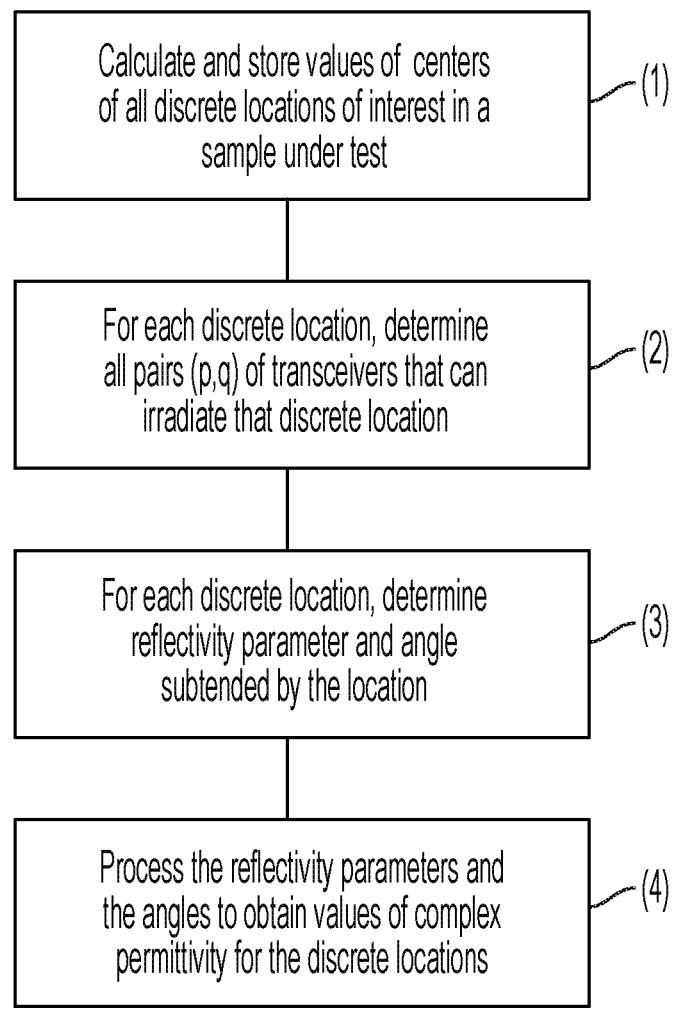
FIG. 3 is a flow chart depicting various steps of a method according to an embodiment for obtaining dielectric properties of a SUT.

The flow chart of FIG. 3 shows an example of a process that can be utilized in some embodiments for acquiring data over different angles of incidence in different frequency bands for a pixel (discrete location). The process can be repeated for all other pixels to obtain data over a selected portion of the object under investigation.

In particular, the values of centers of all pixels (discrete locations) of interest, i.e., the values of $\tilde{x}_{ij}$ for the different pixels, can be calculated and stored (e.g., in a computer memory) (step 1). These values denote the relative positions of any image subsequently formed by a system according to the present teachings.

The above inequality can be solved to determine all pairs (p,q) of transceivers that satisfy the above inequality for all positions, $\tilde{x}_{ij}$ (step 2). In this embodiment, these solutions can be denoted by matrices (i, j, k, p, q). As discussed in more detail below, in some embodiments, multiplexing techniques can be employed such that multiple transceivers would concurrently transmit radiation in different frequency bands (herein enumerated by k). Further, in some embodiments, a system according to the present teachings can be configured to allow for simultaneous transmission of radiation in multiple bands so that data may be gathered on multiple spatial positions, $\tilde{x}_{ij}$ using multiplexing techniques.

With continued reference to the flow chart of FIG. 3, subsequently, amplitude and phase data $\Gamma_{pqk}$ and the associated $\theta_{pq}$ are calculated for all of the matrices (i, j, k, p, q) associated with all pixel positions $\tilde{x}_{ij}$.

Further, calibration of the system using a known sample can be performed, e.g., in a manner discussed above (step 3). Although in this embodiment the calibration step is depicted as the third step, the calibration step can be performed at other points through the process.

The complex permittivities associated with different portions of the SUT and in some embodiments in which the SUT is composed of a plurality of stratified dielectric layers, the thicknesses of the dielectric layers, can be determined by processing the reflectivity parameters $\Gamma_{pqk}$ in conjunction with an electromagnetic model of the SUT and non-linear regression (step 4).

Figure 4:
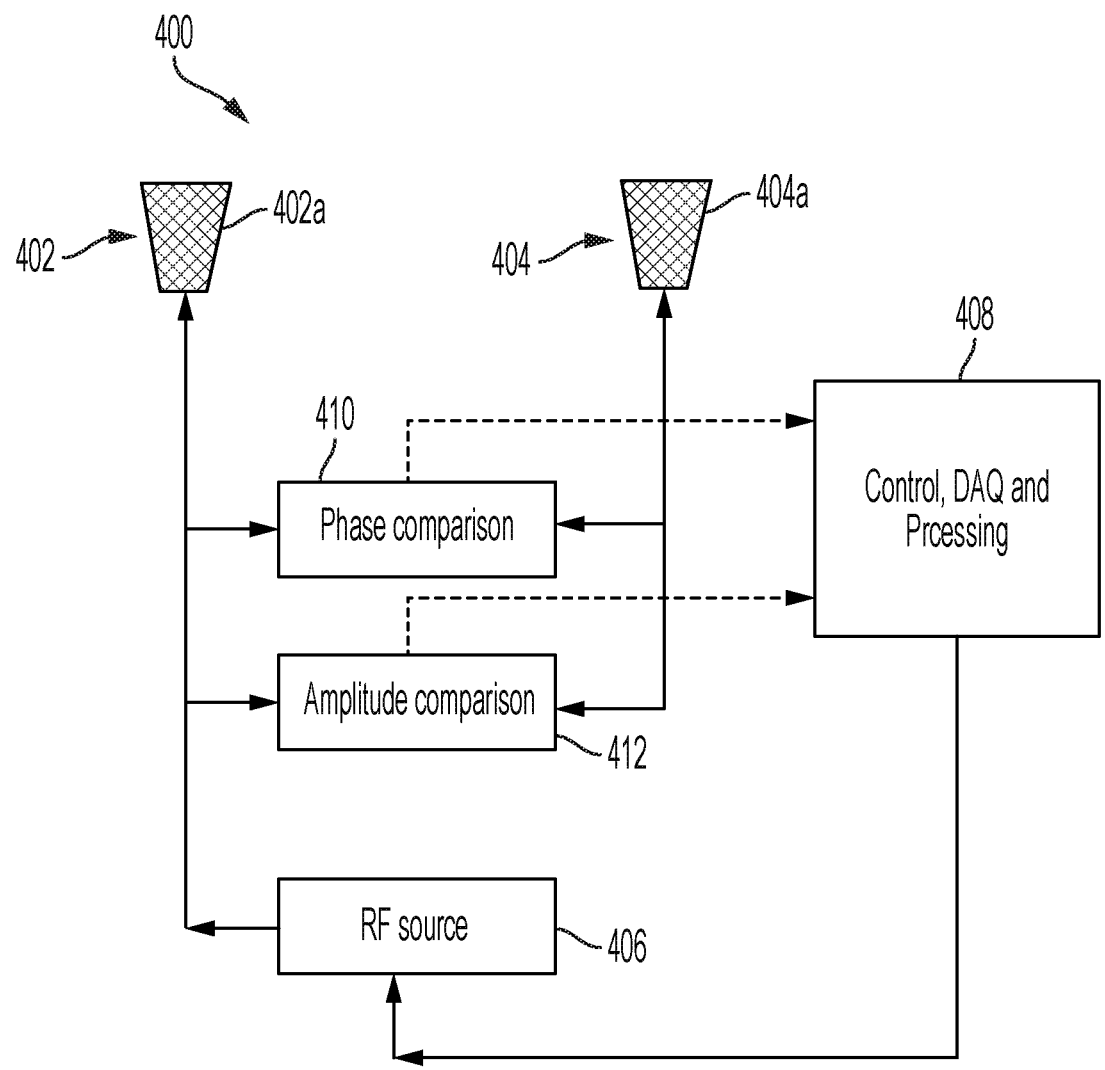
FIG. 4 is a system according to an embodiment, FIG. 5 schematically depicts an example of an implementation of a controller employed in some embodiments of the present teachings, FIG. 6 schematically shows a shoe positioned on a platform of a system according to an embodiment for determining the dielectric properties of the sole of the shoe.

FIG. 4 schematically depicts a system 400 for transmitting radiation from any of transceiver 402/404 of a pair of transceivers to a sample (an object) under test (not shown in this figure) and receiving radiation reflected from the sample by the other transceiver. Specifically, in this embodiment, the system includes a radiofrequency (RF) radiation source 406 (i.e., a millimeter-wave or microwave radiation source) that can generate RF radiation, and operates under control of a controller 408. In this embodiment, each of the transceivers 402/404 includes a horn antenna (402a/404a) that can facilitate the transmission and receipt of the radiation. Each horn antenna (402a/404a) can be coupled to a transmission line (e.g., a waveguide) to receive radiation therefrom or to transfer received reflected radiation thereto. By way of illustration, in this example, the transceiver 402 is assumed to be the transceiver that is employed for irradiating the SUT and the transceiver 404 is assumed to be the transceiver that receives the radiation reflected from the SUT. It should be understood that in many embodiments either of the transceivers can operate as both a transit or a receive element.

At least a portion of the radiation reflected by the SUT in response to radiation emitted by the transceiver 402 is detected by the transceiver 404. A portion of the transmitted radiation and a portion of the detected reflected radiation are inputted into a phase comparison module 410, which determines a phase difference between the transmitted and the reflected radiation and provides information regarding the phase difference to the controller 408. Further, a portion of the transmitted radiation and the detected reflected radiation are inputted into an amplitude comparison module 412, which determines an amplitude difference between the transmitted and the reflected radiation and sends this information to the controller 408.

The controller 408 can process the received information in a manner discussed herein to determine the complex permittivities of various discrete locations (pixels) of the SUT.

Figure 5:
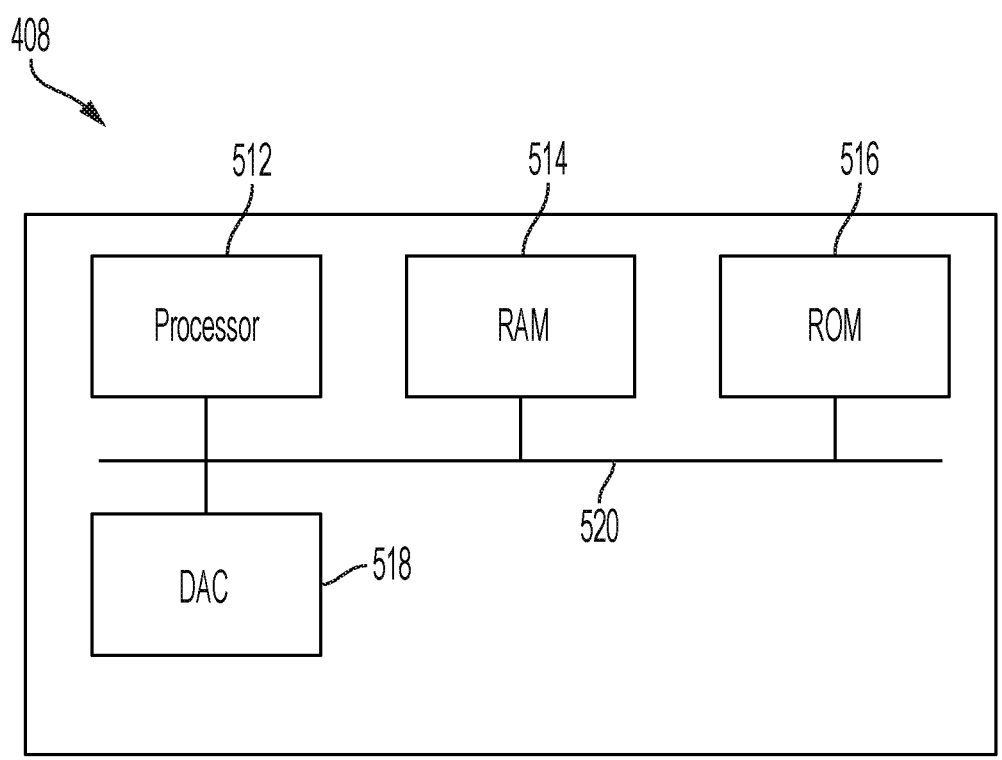

The controller 408 can be implemented in hardware, firmware and/or software using known techniques informed by the present teachings. By way of example, FIG. 5 shows schematically that the controller 408 can include a processor 512, a random access memory (RAM) 514, a permanent memory (e.g., ROM) 516, a digital-to-analog converter (DAC) 518 and a communication bus 520 connecting these components. By way of example, the DAC 518 can digitize the data received from the phase comparison module 410 and the amplitude comparison module 412 and store the information in the RAM 514. Instructions for processing the received information in accordance with the present teachings can be stored in the ROM 516. The processor can effect the loading of the instructions for processing the received data from the ROM 516 into the RAM 514 and execute those instructions so as to determine the complex permittivity associated with a plurality of discrete locations of the sample under test.

Figure 6:
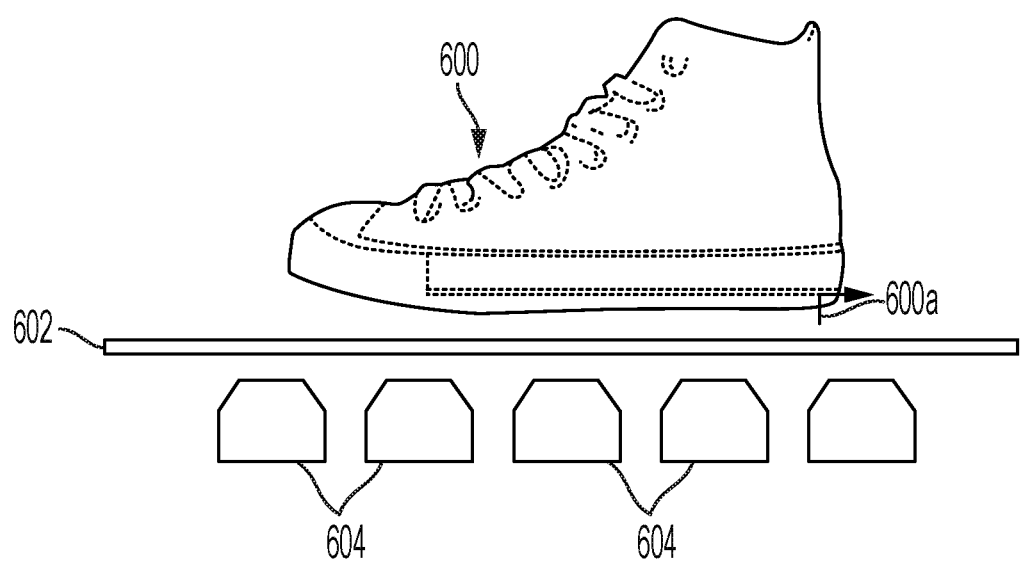

By way of example and further illustration, as shown schematically in FIG. 6, in some embodiments, the SUT can be the sole 600a of a shoe 600. In this embodiment, the shoe 600 is disposed on a platform 602 that is substantially transparent to radiation emitted by a plurality of transceivers 604 positioned below the platform 602. For each pair of the transceivers, at least a portion of the radiation transmitted by a transceiver of the pair is incident on a portion of the sole of the shoe and a portion of such incident radiation is reflected and is detected by the other transceiver of the pair. The data can be analyzed in accordance with the present teachings to obtain the complex permittivities associated with various portions of the sole of the shoe.

Figure 8:
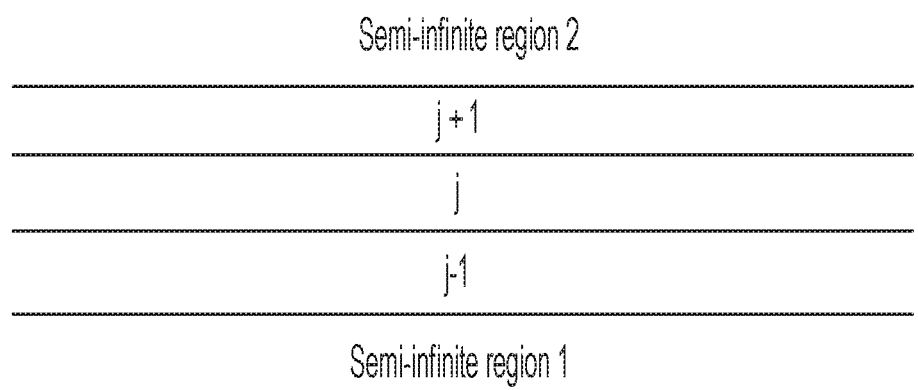

More specifically, in such an embodiment and as shown schematically in FIG. 8, the sole of the shoe can be modeled as n−2 stratified finite layers located between two semi-infinite regions. Choosing a suitable n, a non-linear regression can be performed for different angles of incident radiation to extract the complex permittivity and the thickness of the layers comprising the sole of the shoe. In some embodiments, the non-linear regression is performed for fixed number of layers (i.e., fixed n) while in other embodiments, the number of stratified layers is allowed to vary (i.e., n is treated as a parameter to be determined). For example, the value of n can range between 3 (a single finite layer between two semi-infinite regions) and an upper limiting value: the result of the non-linear best fit of the reflectivity data to the model is compared for each n, and the results with the smallest error (deviation from the model) can be selected.

For s-polarized plane waves (electric field in y-direction) propagating in the $j^{th}$ layer of an n-layer structure, the complex electric field is given by:

$$_y\tilde{E}_j = (_0\tilde{E}_{+j}\exp(i\kappa_j z) + _0\tilde{E}_{-j}\exp(-i\kappa_j z))\exp(i(k_x x - \omega t))$$  Eq. (10)

while the magnetic field is given by:

$$_x\tilde{H}_j = -\frac{\kappa_j}{\mu_j\mu_0\omega}(_0\tilde{E}_{+j}\exp(i\kappa_j z) - _0\tilde{E}_{-j}\exp(-i\kappa_j z))\exp(i(k_x x - \omega t))$$  Eq. (11)

where the wave-vectors are:

$$\kappa_j = k_0\sqrt{\varepsilon_j\mu_j - \varepsilon_1\mu_1\sin^2(\theta)} = k_j + i\alpha_j$$  Eq. (12)

$$k_x = k_0\sqrt{\varepsilon_1\mu_1}\sin(\theta)$$  Eq. (13)

where θ is the angle of incidence in the semi-infinite incident medium and $$k_0 = \frac{\omega}{c}$$

is the wave number in free-space.

By applying boundary conditions on the tangential components of the electric and magnetic fields at the boundary between the j and j+1 layer, the following relations can be obtained:

$$_0\tilde{E}_{+j}\exp(i\kappa_j h_j) + _0\tilde{E}_{+j}\exp(-i\kappa_j h_j) = _0\tilde{E}_{+j+1} + _0\tilde{E}_{-j+1}$$  Eq. (14)

$$\frac{\kappa_j}{\mu_j}(_0\tilde{E}_{+j}\exp(i\kappa_j h_j) - _0\tilde{E}_{-j}\exp(-i\kappa_j h_j)) = \frac{\kappa_{j+1}}{\mu_{j+1}}(_0\tilde{E}_{+j+1} - _0\tilde{E}_{-j+1})$$  Eq. (15)

Using Equations (14) and (15) to express the electric field amplitudes in the j+1 layer in terms of those in the $j^{th}$ layer, one obtains the following:

$$_0\tilde{E}_{+j+1} = \frac{1}{2}(1 + \chi_j)_0\tilde{E}_{+j}\exp(i\kappa_j h_j) + \frac{1}{2}(1 - \chi_j)_0\tilde{E}_{-j}\exp(i\kappa_j h_j)$$  Eq. (16)

$$_0\tilde{E}_{-j+1} = \frac{1}{2}(1 + \chi_j)_0\tilde{E}_{+j}\exp(i\kappa_j h_j) + \frac{1}{2}(1 - \chi_j)_0\tilde{E}_{-j}\exp(i\kappa_j h_j)$$  Eq. (17)

where, $$\chi_j = \frac{\kappa_j \mu_{j+1}}{\kappa_{j+1}\mu_j}.$$

The above Equations (16) and (17) can be written in a matrix format as follows:

$$E_{j+1} = M_j E_j$$  Eq. (18)

and where, $$E_j = \begin{bmatrix} _0\tilde{E}_{+j} \\ _0\tilde{E}_{-j} \end{bmatrix},$$

$$M_j = \begin{bmatrix} \frac{1}{2}(1+\chi_j)\exp(i\kappa_j h_j) & \frac{1}{2}(1-\chi_j)\exp(-i\kappa_j h_j) \\ \frac{1}{2}(1-\chi_j)\exp(i\kappa_j h_j) & \frac{1}{2}(1+\chi_j)\exp(-i\kappa_j h_j) \end{bmatrix}$$

The following recursion relations, i.e., Equations (19) and (20), can be constructed from Equation (18) as follows:

$$E_j = M_{j-1}M_{j-2}\ldots M_1 E_1$$  Eq. (19)

$$E_n = M_{n-1}M_{n-2}\ldots M_1 E_1$$  Eq. (20)

Abbreviating the product of matrices as follows, $M_{j-1}M_{j-2}\ldots M_1 = G_j$ and $M_{n-1}M_{n-2}\ldots M_1 = G_n$, one obtains the following:

$$E^j = G_j E_1$$  Eq. (21)

$$E_n = G_n E_1$$  Eq. (22)

where $G_j$ and $G_n$ are 2×2 matrices, which are defined as follows:

$$G_j = \begin{bmatrix} {}_jg_{1,1} & {}_jg_{1,2} \\ {}_jg_{2,1} & {}_jg_{2,2} \end{bmatrix} \text{ and } G_n = \begin{bmatrix} {}_ng_{1,1} & {}_ng_{1,2} \\ {}_ng_{2,1} & {}_ng_{2,2} \end{bmatrix}$$

As it is assumed that the $n^{th}$ layer is semi-infinite in extent, there is no reflected wave in this layer, and hence one obtains the following:

$${}_0\tilde{E}_{+n} = {}_ng_{1,10}\tilde{E}_{+1} + {}_ng_{1,20}\tilde{E}_{-1} \quad \text{Eq. (23)}$$

$${}_ng_{2,10}\tilde{E}_{+1} + {}_ng_{2,20}\tilde{E}_{-1} = 0 \quad \text{Eq. (24)}$$

Thus, the reflectivity (Γ) of the system is given by the following relation:

$$\Gamma = \frac{{}_ng_{2,1}}{{}_ng_{2,2}} \quad \text{Eq. (25)}$$

The analogous expressions for p-polarized waves can be obtained by applying the following transformations:

$\underline{E} \to \underline{H}$ $\underline{H} \to -\underline{E}$ $\varepsilon_0 \varepsilon \Leftrightarrow \mu_0 \mu$ The above Equation (25) provides the reflectivity coefficient as a function of the structure (n-layer model), polarization state, angle of incidence and frequency of the radiation. Using this equation, non-linear regression can be used to best fit the observed reflectivity data to the chosen n-layer model, thereby extracting the complex permittivity and layer thickness for the finite media under investigation (e.g., the sole of a shoe).

Figure 7A:
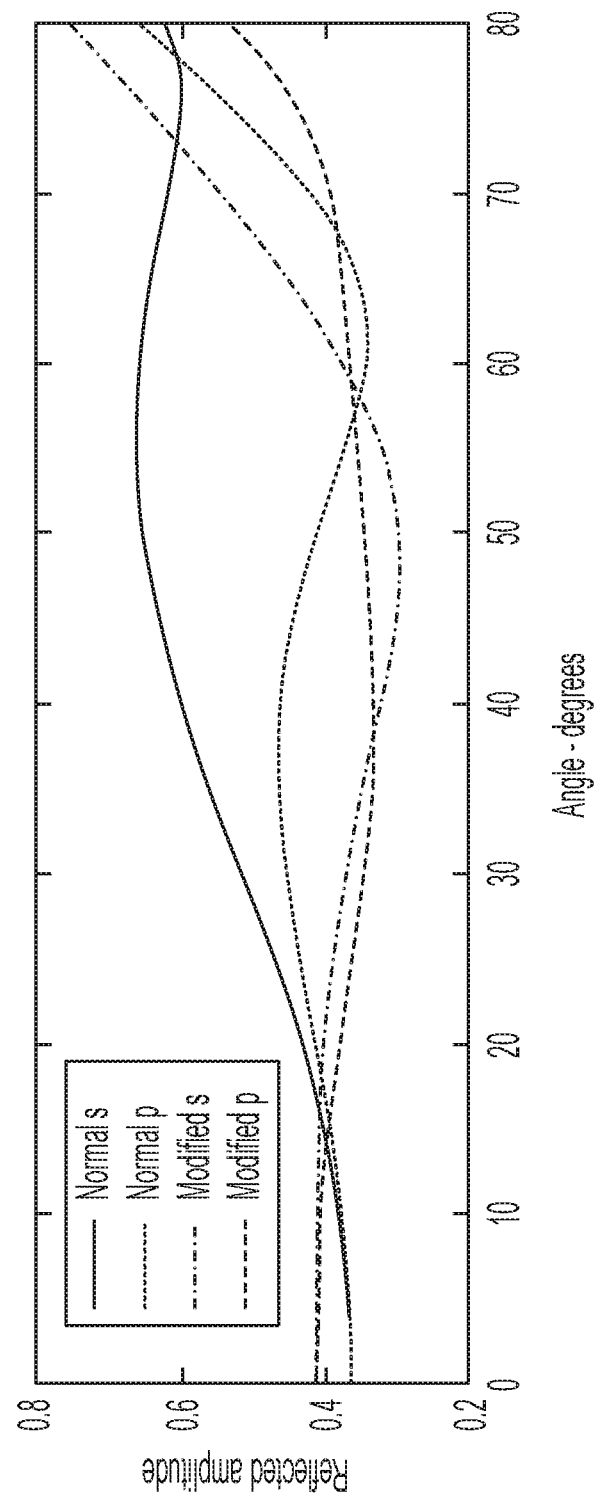
FIGS. 7A and 7B depict theoretically-calculated values of reflectivity for s- and p-polarized waves at a frequency of 20 GHz for two stratified media, FIG. 8 schematically depicts various layers of a stratified medium, and FIG. 9 schematically depicts a system according to an embodiment of the present teachings.
Figure 7B:
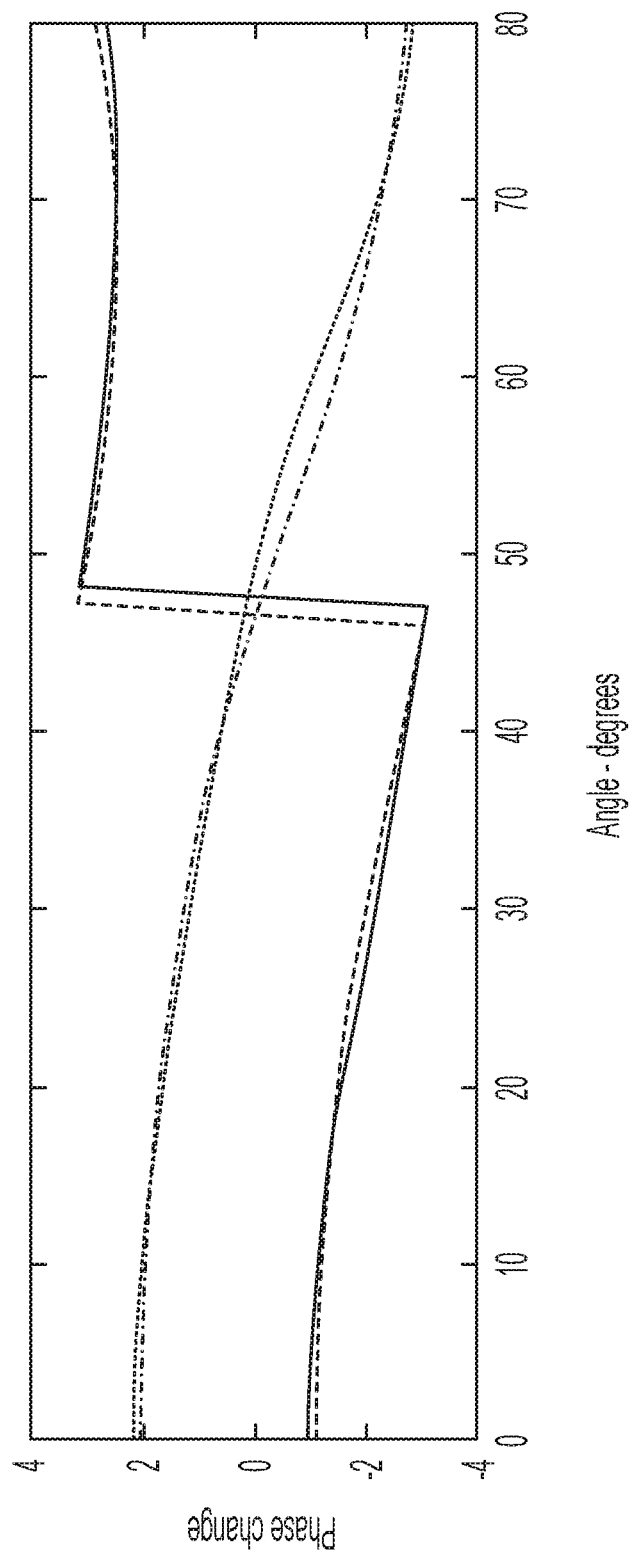

By way of example and further illustration, FIGS. 7A and 7B show the values of reflectivity (amplitude and phase change) for s- and p-polarized waves at a frequency of 20 GHz in two different stratified media which are herein referred to a "Normal" and "Modified." The Normal medium was assumed to include a plurality of stratified layers having the following complex permittivities: 1, 1.8*(1+1i*E−2), 2.0*(1+3i*1E−2), and 15+1i*10 with a thickness of 10 mm and 3 mm between semi-infinite media of air and skin. The media are described, with thickness of 10 mm and 3 mm for the unmodified medium (see above) and a thickness of 3.8 and 2 mm for the modified medium (see below). The unmodified medium includes 4 layers (i.e., air/shoe material 1/shoe material 2/skin), and the modified medium includes 5 layers (i.e., air/shoe material 1/new inserted material/shoe material 2/skin).

The modified medium, in turn, includes layers with the following complex permittivities: 1, 1.8*(1+1i*1E−2), 3*(1+7i*1E−2), 2.0*(1+3i*1E−2), and 15+1i*10; with thicknesses of 3 mm, 8 mm and 2 mm between semi-infinite media of air and skin.

The four graphs per plot consist of two for the unmodified (Normal) medium (s- and p-polarization) and two for the Modified medium (s- and p-polarization).

Referring again to FIG. 4, in some embodiments, the controller 408 can be programmed to activate the transceivers sequentially, i.e., one at a time, to illuminate different portions of a SUT, e.g., the sole of a shoe. For each activated transceiver illuminating a portion of the SUT with its emitted radiation, the controller 408 can receive information associated with radiation detected by all transceivers that receive radiation reflected from the SUT. As noted above, such information can include, for example, the phase difference and the amplitude difference between the transmitted and the reflected radiation. In this manner, pairs of transmitting/detecting transceivers can be identified, and the information regarding the transmitted and the detected radiation can be utilized in a manner disclosed herein to arrive at the complex permittivities of various portions of the SUT.

In some other embodiments, multiple transceivers emitting radiation in different frequency bands can be concurrently activated to illuminate concurrently different portions of the SUT with radiation in different frequency bands. The number of frequency steps, M, may be selected based on the unambiguous radar range that is required. For example, if the greatest path length anticipated between any pair of receivers were L, then an unambiguous radar range of greater than L would be required in order to prevent aliasing and the associated ambiguity of range to the scattering surfaces. The number of the frequency points must fulfill:

$$M > 1 + \frac{2L\Delta f}{c},$$

where Δf is the frequency bandwidth and c is the speed of light.

A complete frequency sweep, in a single polarization state, using all (non-degenerate) pairs of transceivers would require $$\frac{MN(N+1)}{2}$$

operations. By way of example, the operations can be executed sequentially, by cycling through all M frequency steps in one transmitting transceiver while receiving the reflected radiation on an individual transceiver, before moving to the next combination. Such a configuration would be generally slow to operate, especially for large values of M and N.

Assuming that the repeat time between stepping frequency points is τ, in such a case, a total operational time of $$\frac{MN(N+1)\tau}{2}$$

would be required. The fastest operation would be achieved by transmitting a different frequency step from all transceivers simultaneously and receiving the reflected radiation on all transceivers. Transceivers can, for example, be cyclically shifted one frequency step from one another in such a way as to ensure that only one transceiver would be transmitting in each frequency band at any time, i.e. the generalized permutation matrix defined by the elements $A_{jk}$ which consists of zero values except in one position per column and in one position per row, or a matrix which contains a square sub-matrix which is a generalized permutation matrix and corresponds to the transmitting transceivers and frequency bands transmitted at a given time. Thus, in this mode of operation, if the number of steps and the number of transceivers are equal, that is, M=N, an operational time of N τ would be required. In the more probable case where N<M, one can only choose a subset of N different frequencies from the M available frequencies and ensure that all transceivers transmit on one frequency band at a time. In such a case, the operational time would ≈Mτ. In the final case where N>M, the operational time would be ≈Nτ.

Figure 9:
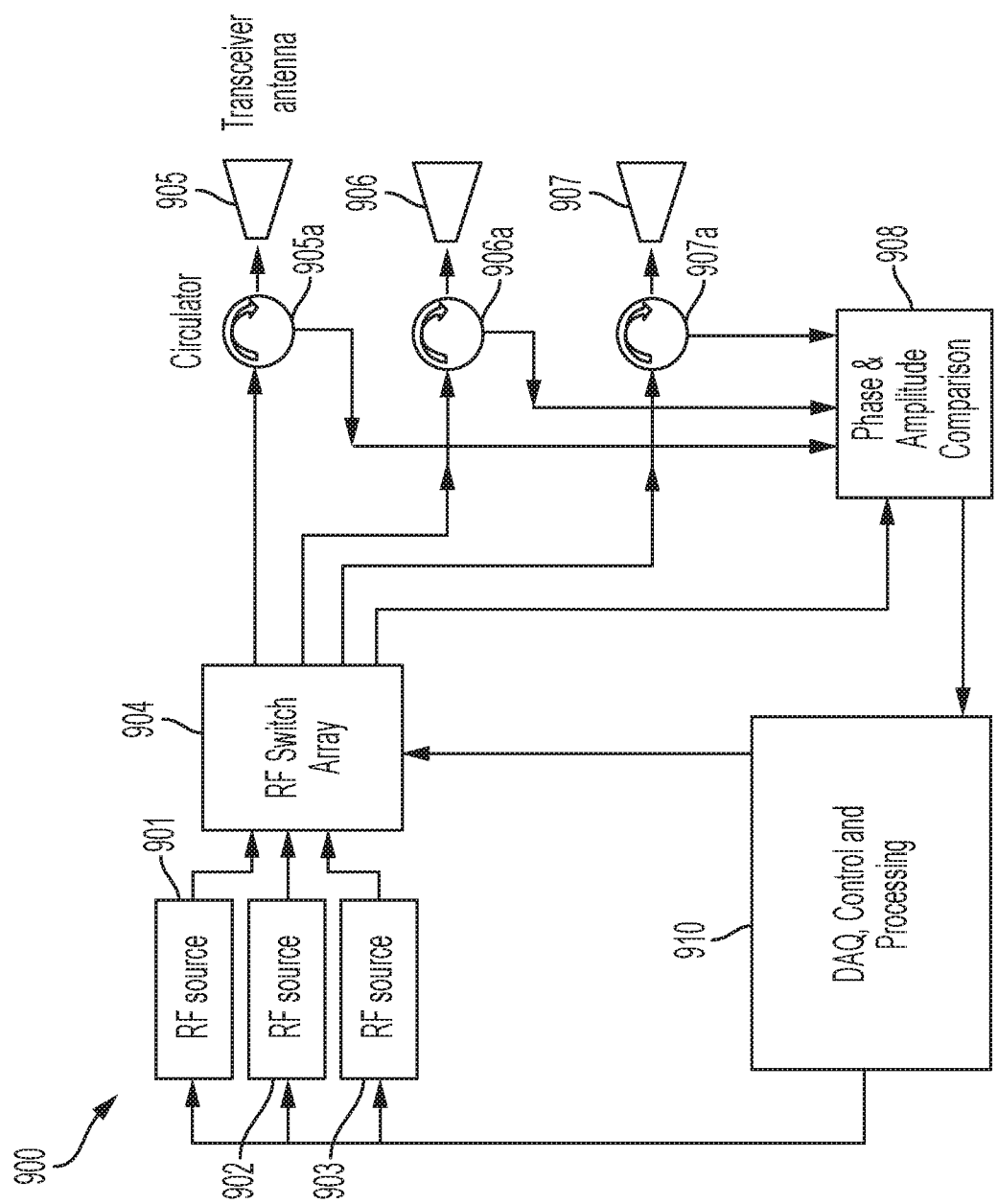

FIG. 9 schematically depicts an example of an implementation of an embodiment in which a plurality of transceivers are concurrently activated to emit radiation in different frequency bands. In this embodiment, a system 900 includes a plurality of RF radiation sources 901, 902, and 903 that can generate microwave or millimeter-wave radiation in different frequency bands. Although in this embodiment, three RF radiation sources are depicted, in other embodiments more or less than three radiation sources can be employed, e.g., in a range of 2 to about 20.

An RF switch array 904 is in communication with the plurality of the RF sources to receive radiation therefrom and to transmit radiation from each RF source to one or more of a plurality of transceivers 905, 906, and 907 such that the plurality of transceivers will concurrently emit radiation at the different frequencies provided by the RF radiation sources 901, 902, and 903 so as to irradiate different portions of a sample under test (SUT). In some implementations, each transceiver emits radiation at a different frequency (and more generally within a frequency band) while in other embodiments, different subsets of the transceivers emit radiation in different frequency bands. For example, in some such embodiments, the RF switch array 904 can be configured to route radiation generated by each of the radiation sources 901, 902, and 903 to a different subset of the transceivers.

Each transceiver 905/906/907 not only emits radiation toward a sample under test (SUT) but it also detects radiation reflected from the SUT in response to irradiation thereof by one or more of the other transceivers. A plurality of circulators 905a, 906a, and 907a are coupled to the transceivers 905, 906, and 907 (in some embodiments, the circulators are incorporated within the transceivers), respectively, to direct radiation received by each transceiver to a phase and amplitude comparison circuitry 908 that provides an amplitude and phase difference between the amplitude and the phase of the radiation detected by a transceiver at a particular frequency and the amplitude and the phase of radiation at that frequency that is emitted toward the SUT.

With continued reference to FIG. 9, the RF switch array 904 is in communication with the phase and amplitude circuitry 908 to provide a portion of the radiation emitted by each RF source thereto so that the phase and amplitude circuitry 908 can accomplish the aforementioned amplitude and phase comparison.

The system 900 further includes a control and processing module 910 that can control the RF switch array 904 and is also coupled to the amplitude and phase comparison circuitry 908 to receive the phase and amplitude comparison data therefrom and operate on that data to extract dielectric properties of the SUT in a manner disclosed herein.

The control and processing module 910 can be implemented in hardware, firmware and/or software using techniques known in the art as informed by the present teachings. By way of example, the control and processing module can include a digital-to-analog converter to digitize the data received from the amplitude and phase comparison circuitry and one or more memory modules for storing data as well as instructions for operating the data as well as a processor that can control the operation of various components of the module. In some embodiments, a known SUT, i.e., a calibration SUT, can be used to test the performance of the system. For example, a SUT for which the thickness and complex permittivity are known can be used to test the system performance. More specifically, for such a known SUT, the complex permittivity and thickness of one or more dielectric layers of the SUT can be determined using a system according to the present teachings, and the determined parameters can be compared with the known parameters in order to evaluate the performance of the system. By way of example, a planar sheet of a dielectric material, such as Perspex®, with a known thickness can be a suitable test specimen.

A system according to the present teachings provides a number of advantages. For example, it allows determining complex permittivity of a multi-layer object, such as the sole of a shoe, via interrogation with microwave or millimeter-wave radiation. Such a system can be used, for example, as a security system and can be deployed, for example, in various ports of entry.

Those having ordinary skill in the art will appreciate that various changes can be made to the above embodiments without departing from the scope of the invention.

What is claimed is:

1. A system for obtaining dielectric properties of an object, the system comprising:
   a plurality of transceivers configured to generate and detect radiation in at least one of a microwave-wave region and millimeter-wave region of an electromagnetic spectrum, each transceiver pair being positioned in spatially fixed relationships relative to other transceivers; and
   a processor configured to implement:
      a controller configured to selectively activate two or more transceivers to generate transmission signals configured to irradiate at least a portion of said object such that for each of the transmission signals generated by one of the plurality of transceivers, at least another one of the plurality of transceivers generates a detection signal in response to detection of at least a portion of radiation reflected from the at least one portion of the object in response to irradiation by the transmission signals; and
      an analyzer configured to compute, for each pixel of a plurality of pixels in the at least one portion of the object, one or more pair-wise reflectivity coefficients such that each pair-wise reflectivity coefficient is computed based on a reflection signal generated by one of the plurality of transceivers in response to a signal transmitted by another one of the plurality of transceivers, and is proportional to a ratio of the reflection signal to the signal transmitted;
      wherein for at least one pixel of the plurality of pixels, a plurality of distinct pair-wise reflectivity coefficients is computed.

2. The system of claim 1, wherein said analyzer further computes, for each of said plurality of pixels and for a pair of transceivers positioned to irradiate said pixel, an angle subtended between said pixel and said pair of transceivers.

3. The system of claim 1, wherein each of said reflectivity coefficients is represented as a complex number having a magnitude that is indicative of a fraction of radiation reflected from said pixel in response to radiation incident thereon via a transceiver in a pair of transceivers associated with said reflectivity coefficient, and an imaginary component indicative of a phase shift associated with said reflected radiation.

4. The system of claim 3, wherein said analyzer is configured to compute a complex permittivity associated with said pixel based on said reflectivity coefficient and said angle corresponding to said pixel.

5. The system of claim 1, wherein said analyzer employs an electromagnetic model of said object and non-linear regression to fit said reflectivity coefficients and said angles to one or more parameters of said model so as to extract said complex permittivity.

6. The system of claim 5, wherein said object comprises a plurality of stratified dielectric layers.

7. The system of claim 6, wherein said analyzer employs said electromagnetic model and said non-linear regression to derive complex permittivities and thicknesses of said stratified dielectric layers.

8. The system of claim 5, wherein said object comprises a sole of a shoe.

9. The system of claim 8, wherein said shoe is positioned on a platform that is substantially transparent to radiation emitted by said transceivers.

10. The system of claim 9, wherein the electromagnetic model of the sole of the shoe represents the sole as a stratified region comprising a finite number of layers disposed between two semi-infinite regions.

11. The system of claim 10, wherein one of said semi-infinite layers comprises air and another one of said semi-infinite layers comprises skin.

12. The system of claim 10, wherein said analyzer employs said electromagnetic model of the sole of the shoe and non-linear regression to determine complex permittivity and thickness of each of said finite number of layers.

13. The system of claim 1, wherein each of said reflectivity coefficients is represented by the following relation:

$$B_{ik} = A_{jk} F_{ijk} \Gamma_{ijk},$$

wherein,
$B_{ik}$ represents a signal in $k^{th}$ frequency band received by the $i^{th}$ transceiver,
$A_{jk}$ represents a signal transmitted in $k^{th}$ frequency band by the $j^{th}$ transceiver,
$\Gamma_{ijk}$ represents a reflectivity coefficient that relates $B_{ik}$ and $A_{jk}$, and
$F_{ijk}$ represents propagation effects between the $i^{th}$ and the $j^{th}$ transceivers.

14. The system of claim 13, wherein said analyzer is configured to compute each of said $F_{ijk}$ coefficients via calibration.

15. The system of claim 1, wherein said controller is configured to activate transceivers of the plurality of transceiver sequentially to transmit radiation to said object.

16. The system of claim 1, wherein said controller is configured to activate at least a portion of transceivers of the plurality of transceiver pairs concurrently.

17. The system of claim 16, wherein said concurrently-activated transceivers emit radiation in different frequency bands.

18. The system of claim 1, wherein at least a portion of the plurality of transceiver pairs is configured to generate polarized electromagnetic radiation.

19. The system of claim 18, wherein said polarized electromagnetic radiation has any of p or s polarization.

20. The system of claim 19, wherein said controller is configured to activate the plurality of transceivers to irradiate said portion of the object with p-polarized radiation during one temporal period and with s-polarized radiation during another temporal period.

21. The system of claim 20, wherein said analyzer computes said reflectivity coefficients for s- and p-polarized radiation.

22. A system for scanning a sole of a shoe, comprising:
a plurality of transceivers configured to generate and detect radiation in at least one of a microwave-wave region and millimeter-wave region of an electromagnetic spectrum, each transceiver pair being positioned in spatially fixed relationships relative to other transceivers;
a platform on which the shoe can be positioned, said platform being substantially transparent to radiation emitted by said transceivers and positioned relative to said transceivers to allow illumination of the sole of the shoe by radiation emitted by the transceivers; and
a processor configured to implement:
a controller configured to selectively activate two or more transceivers to generate transmission signals configured to irradiate at least a portion of said object such that for each of the transmission signals generated by one of the plurality of transceivers, at least another one of the plurality of transceivers generates a detection signal in response to detection of at least a portion of radiation reflected from the at least one portion of the object in response to irradiation by the transmission signals; and
an analyzer configured to compute, for each pixel of a plurality of pixels in the at least one portion of the object, one or more pair-wise reflectivity coefficients such that each pair-wise reflectivity coefficient is computed based on a reflection signal generated by one of the plurality of transceivers in response to a signal transmitted by another one of the plurality of transceivers, and is proportional to a ratio of the reflection signal to the signal transmitted, said analyzer further being configured to compute, for each of said plurality of pixels and for each two transceivers from the plurality of transceivers, positioned to illuminate said pixel, an angle subtended between said pixel and said two transceivers, and
wherein said analyzer is configured to compute a complex reflectivity coefficient associated with each of said pixels based on said reflectivity coefficient and said angle corresponding to that pixel.

23. The system of claim 22, wherein each of said reflectivity coefficients is represented as a complex number having a magnitude that is indicative of a fraction of radiation reflected from said pixel in response to radiation incident thereon via a transceiver in a pair of transceivers associated with said reflectivity coefficient, and an imaginary component indicative of a phase shift associated with said reflected radiation.

24. The system of claim 22, wherein said analyzer employs an electromagnetic model of said sole of the shoe and non-linear regression to fit said reflectivity coefficients and said angles to one or more parameters of said model so as to extract said complex permittivity for each of said pixels.

25. The system of claim 22, wherein each of said reflectivity coefficients is represented by the following relation:

$$B_{ik} = A_{jk} F_{ijk} \Gamma_{ijk},$$

wherein,
$B_{ik}$ represents a signal in $k^{th}$ frequency band received by the $i^{th}$ transceiver,
$A_{jk}$ represents a signal transmitted in $k^{th}$ frequency band by the $j^{th}$ transceiver,
$\Gamma_{ijk}$ represents a reflectivity coefficient that relates $B_{ik}$ and $A_{jk}$, and
$F_{ijk}$ represents propagation effects between the $i^{th}$ and the $j^{th}$ transceivers.

26. The system of claim 25, wherein said analyzer is configured to compute each of said $F_{ijk}$ coefficients via calibration.

27. The system of claim 22, wherein said sole of the shoe comprises a plurality of stratified dielectric layers.

28. The system of claim 27, wherein said analyzer employs said electromagnetic model and said non-linear regression to derive complex permittivities and thicknesses of said stratified dielectric layers.

29. The system of claim 22, wherein said controller is configured to activate said transceivers the plurality of transceiver sequentially to transmit radiation to said object.

30. The system of claim 22, wherein said controller is configured to activate at least a portion of said transceivers the plurality of transceiver concurrently.

* * * * *